United States Patent [19]

Rivkin et al.

[11] 4,096,745

[45] Jun. 27, 1978

[54] METHOD AND APPARATUS FOR MEASURING MASS FLOW RATE OF INDIVIDUAL COMPONENTS OF TWO-PHASE GAS-LIQUID MEDIUM

[76] Inventors: Ilya Yakovlevich Rivkin, 2 Kvesisskaya ulitsa, 22, kv. 16; Shamil Mustafovich Aisin, Tsvetnoi bulvar, 16/1, kv. 4; Olga Ivanovna Garkusha, B.Serpukhovskaya ulitsa, 34, korpus 5, kv. 245; Alexandr Lvovich Dondoshansky, 9 Parkovaya ulitsa, 47, korpus 1, kv. 70; Evgeny Alfredovich Zellis, Kashirskoe shosse, 100, stroenie 1, kv. 44; Vladilen Efremovich Karpov, ulitsa Miklukho-Maklaya, 65, korpus 4, kv. 86; Vladimir Konstantinovich Sorokin, Leninsky prospekt, 37, kv. 26; Oleg Petrovich Shishkin, prospekt Vernadskogo, 89/1, kv. 111, all of Moscow, U.S.S.R.

[21] Appl. No.: 657,840

[22] Filed: Feb. 13, 1976

[51] Int. Cl.² ............................ G01F 1/66; G01F 1/76
[52] U.S. Cl. ................................ 73/194 B; 73/32 A; 73/194 M
[58] Field of Search ............. 73/194 B, 194 M, 32 A, 73/61 R

[56] References Cited

U.S. PATENT DOCUMENTS 3,080,750    3/1963    Wiley ..................................... 73/194
3,218,851   11/1965    Sipin ..................................... 73/194

Primary Examiner—Herbert Goldstein
Attorney, Agent, or Firm—Lackenbach, Lilling & Siegel

[57] ABSTRACT

A method for measuring the mass flow rate of individual components of a two-phase medium comprises feeding a flow of a medium to be measured through a hollow pendulum, imparting undamped oscillations to the pendulum, measuring energy required to maintain a constant oscillation velocity, the mass flow of the medium being assumed proportional to the measured energy value and the average density of the medium being assumed proportional to the measured fundamental frequency of the pendulum, and determining mass flow of each component from mathematical relationships.

An apparatus for carrying out the method for measuring the mass flow rate of individual components of a two-phase medium comprises a sealed housing accommodating a hollow pendulum supported therein. The housing mounts an electromagnetic coil for imparting undamped oscillations to the pendulum and an electromagnetic coil for converting oscillation velocity. Output frequency signals of converters are proportional to the mass flow rate of the two-phase medium and to the density of the two-phase medium being measured.

10 Claims, 6 Drawing Figures

METHOD AND APPARATUS FOR MEASURING MASS FLOW RATE OF INDIVIDUAL COMPONENTS OF TWO-PHASE GAS-LIQUID MEDIUM

The invention relates to the field of measurement of mass flow rate of liquids and gases and more particularly, to a method and apparatus for measuring the mass flow rate of individual components of a two-phase medium. The measuring of the mass flow rate of individual components of two-phase media is an important problem for chemical, food, oil, gas and petrochemical industries, and this problem is also critical in determining the mass flow rate of pulverulent and granular products, as well as suspensions in conveying them along pipelines.

It is known to determine the mass flow rate of individual components of two-phase media by the method comprising preliminarily separating a mixture into components and measuring the mass flow rate of each component. This method is rather complicated and inaccurate since the accuracy of measurement depends on the quality of separation of a mixture.

It is known to measure flow rate of individual components of two-component flows (cf. USSR Inventor's Certificate No. 189170, Int. Cl. G 01 f, 1966), wherein volumetric and mass flow rates of a two-component flow are measured by using volumetric and mass flow rate sensors, respectively, which are mounted one after another along the flow path. Signals proportional to the values of the measured flow rates are fed to a computer which solves a set of two equations with respect to variables representing volumetric and mass flow rates of individual components. By this method, the influence of the shear value on the measurement results is eliminated. In this case, the accuracy of measurements depends on fluctuations of the flow structure, variations of the pattern of velocity and pressure fields which are inevitable in different points of a pipeline.

The above factors result in the readings of volumetric and mass flow rate sensors operating in the flow in different sections of the pipeline being difficult to correlate. In addition, when using the most widely employed flow rate sensors with mechanical elements cooperating with the flow (turbines, streamlined bodies, restrictors), it is necessary to eliminate the effect of the first sensor on the sensors located downstream.

Known in the art is a method for measuring the flow rate of liquid and gas in a flow of a gas-liquid mixture for sealed oil and gas collection systems, wherein oil and gas flow together along a single pipeline (cf. Instruments and Control Systems (Pribory i sistemy upravlenija), No. 10, 1972, pp. 18 – 20). In measuring flow rate by this method, a rotary volumetric sensor is used for determination of the value of volumetric flow rate of the mixture, as well as a standard restrictor, such as a diaphragm. With known volumetric flow rate of the mixture, which is measured by a flow meter, and pressure difference at the diaphragm, the density of the gas-liquid medium can be determined. With known density values for liquid and gas in the mixture, volumetric gas content and flow rates of liquid and gas are determined. In so doing, the assumption is made that the actual volumetric gas distribution is identical with the flow rate distribution. This assumption results in large measurement errors. In order to limit the measurement errors to 3 – 4%, a special calibration of the diaphragm and flow meter should be effected for each mixture to be measured. Standard diaphragms used for the determination of the flow rate of single-phase liquids may be used only in case the diaphragm modulus is at least 0.5, and, besides, it is necessary that gas content of the mixture should not exceed 0.5. In practice, this value is as high as 25.

The majority of known methods for measuring the mass flow rate of individual components of two-phase media are characterized by the employment of a mass flow meter whose measuring qualities have the paramount effect on the measurement error.

Known in the art are vibration mass flow meters which are very simple and reliable, having no rotatable parts or elements obstructing the flow. Besides, such vibration mass flow meters give readings independent of the viscosity of a medium being measured.

Known in the art is a vibration mass flow meter (cf. U.S. Pat. No. 3,080,350, Cl. 73-194, 1963; or G. P. Katys, Automatic Control System for Velocity and Flow Rate Fields (Sistema avtomaticheskogo kontrolja polej skorostej i raskhodov), pp. 211-214) comprising a cantilevered pipe through which a flow of a medium being measured freely passes out into a reservoir. The pipe vibrates at a constant frequency which is close to resonance frequency. The flow meter also comprises a means imparting to the pipe oscillations about an axis normal to the pipe axis, and a means for measuring amplitude of the pipe oscillations. In addition, the flow meter comprises a device for maintaining the amplitude of oscillations of the pipe at a constant level and a means for measuring the moment applied to the pipe. With the oscillations amplitude remaining constant, the value of moment is proportional to the mass flow rate. This flow meter cannot, however, be used for measuring the mass flow rate of two-phase mixtures since in measuring the mass flow rate of two-phase media with variable phase-to-phase ratio, the oscillation frequency of the pipe also varies thus resulting in a non-linear dependence of the moment on the mass flow rate and also in a considerable increase in measurement error.

Known in the art is a vibration mass flow meter (cf. USSR Inventor's Certificate No. 243860, Int. Cl.G 01f, 1967; or Instruments and Control Systems (Pribory i sistemy upravlenija, No. 11, 1973, pp. 22-24) comprising a cantilevered tube performing undamped oscillations. A weight is attached to the distal end of the tube to stabilize the resonance frequency of the tube so as to eliminate the effects of fluctuations of specific gravity of a medium on the measurement results and to improve the accuracy of measurement of flow rates of two-phase media. The tube is accommodated in a sealed housing so that the measurement can be performed under high pressures. The flow meter also comprises an electromagnet for imparting oscillations to the tube, a converter for converting mechanical oscillations into electrical signals and a circuit for measuring decrement which is proportional to the mass flow rate being measured.

This flow meter also cannot be used for measuring flow rates of individual components because data signals received from the flow meter are proportional to a single parameter only — the mass flow rate of a mixture.

Known in the art is still another vibration mass flow meter (cf. U.S. Pat. No. 3,218,851, Cl. 73-194, 1965) comprising a sealed housing and a pipe fixed therein by means of leaf springs. A flow of a medium being measured is fed through the pipe which imparts an oscillatory motion to the flow. The flow meter also comprises a means for imparting oscillations and a converter generating an electric signal which is proportional to the oscillation velocity.

Means for measuring the oscillation velocity of the pipe and means for imparting oscillations are coupled to each other via an amplifier to form, in combination with the pipe, an electromechanical oscillator. The oscillation velocity of the pipe is maintained at a constant level due to an automatic gain control of the amplifier using an automatic gain control system. It is noted that the energy applied to the oscillating pipe is proportional to the mass flow rate of the medium being measured.

It should, however, be noted that this construction of the flow meter does not enable measurements of mass flow rate of each component of a multiphase medium. Output signal of the flow meter is proportional only to the mass flow rate of a single-phase medium and cannot bring any information useful for determination of flow rates of individual components of a medium.

It is an object of the present invention to provide a method for measuring the mass flow rate of individual components of two-phase gas-liquid medium.

Another object of the invention is to provide a method for measuring the mass flow rate of individual components of two-phase three-component medium.

Still another object of the invention is to provide an apparatus for carrying out the method for measuring the mass flow rate of individual components of a two-phase three-component medium according to the invention.

The above objects are accomplished by the method for measuring the mass flow rate of individual components of a two-phase gas-liquid medium according to the invention which comprises feeding a flow of a two-component medium being measured through a hollow pendulum, imparting undamped mechanical oscillations to the pendulum, maintaining a constant oscillation velocity of the pendulum, measuring energy required for maintaining a constant oscillation velocity, the mass flow rate of the medium being assumed proportional to the measured energy value, measuring fundamental frequency of the pendulum, the average density of the medium being assumed proportional to the measured fundamental frequency of the pendulum, measuring pressure within the pendulum and determining the mass flow rate of each component of the medium being measured from the following formulae:

$$G_1 = \frac{C_1 \cdot W}{1 + \frac{\rho_2}{\rho_1} \cdot \alpha_1},$$

$$G_2 = \frac{\rho_2}{\rho_1} \cdot G_1 \cdot \alpha_1,$$

wherein $G_1$ is the mass flow rate of the liquid phase, $G_2$ is the mass flow rate of gas, $\alpha_1$ is gas content determined from the formula $$\alpha_1 = P \frac{1 - \frac{\rho}{\rho_1}}{C(1 - P \cdot \frac{\rho_2}{\rho_1}) - (1 - \frac{\rho}{\rho_1})},$$

wherein $(\rho/\rho_1)$ is the ratio of the average density $\rho$ of the medium to the density of the liquid phase $\rho_1$ which is approximately equal to the ratio of the value of deviation of the fundamental frequency of the pendulum to the value of deviation of the fundamental frequency of the pendulum filled with the liquid phase, $\rho_2$ is the density of the gaseous phase at normal pressure, $P$ is the dimensionless value which is the numerically equal to the absolute pressure, $C$ is the proportionality factor establishing the dependence of actual gas content $\varphi$ and the flow rate gas content $\beta$, $W$ is the energy required to compensate for losses occurring during the pendulum oscillations, and $C_1$ is the proportionality factor.

In the case of an oil-water-gas medium, wherein the gas factor $\alpha$ is constant for each given oil field and equal to the ratio of volumetric flow rate of gas $Q_2$ to volumetric flow rate of oil $Q_3$, and wherein gas content $\alpha_1$ depends only on water content $\sigma$ which is determined by the relationship:

$$\sigma = \frac{2b \pm \sqrt{4b^2 - 4ac}}{2a}$$

wherein $a = (1 - c)(\rho_4 - \rho_3),$ $2b = \rho + b_1 \cdot P - b_2, c_2 = (1 - \frac{P}{\alpha}) \cdot \rho + c_3 \cdot \rho + c_4,$ $b_1 = \frac{\rho_4 - \rho_3}{\alpha} - c \cdot \rho_2, b_2 = (1 - c)(2\rho_3 - \rho_4),$ $c_1 = \frac{\rho_3}{\alpha} + c \cdot \rho_2, c_2 = (1 - c) \cdot \rho_3,$ $C_2, C_3, C_4$ are proportionality factors, $\rho_3$ is oil density, $\rho_4$ is water density, $\rho_1 = \rho_3 + (\rho_4 - \rho_3) \cdot \sigma$, $\alpha_1 = \alpha (1 - \sigma)$ is gas content, the flow rate of each component of the liquid phase is preferably determined from the following formulae:

$G_3 = (\rho_3/\rho_1) \cdot G_1 (1 - \sigma),$ $G_4 = (\rho_4/\rho_1) \cdot G_1 \cdot \sigma,$ wherein $G_3$ is the mass flow rate of oil and $G_4$ is the mass flow rate of water.

For a two-phase three-component medium the actual volumetric gas content $\varphi$ in the pendulum is also preferably measured from which the gas content $\alpha_1$ is determined by the formula:

$\alpha_1 = \varphi/(C_4 - \varphi),$ the density of the liquid phase $\rho_1$ being determined by the formula $\rho_1 = \rho_5 + (\rho_6 - \rho_5) \cdot \sigma_1$, where $\rho_5$ is the density of a first component of the liquid phase; $\rho_6$ is density of a second component of the liquid phase, and $\rho_6 > \rho_5$, and $\sigma_1$ is the content of the first component of the liquid phase in the liquid phase proper which is determined from the relationship $$\sigma_1 = \frac{\rho_5(1 - \varphi) + \rho_2 \cdot \varphi - \rho}{(\rho_6 - \rho_5)(1 - \varphi)},$$

and the content of each component is preferably determined by the following formulae:

$G_5 = (\rho_5/\rho_1) \cdot G_1 (1 - \sigma_1),$ $G_6 = (\rho_6/\rho_1) \cdot G_1 \cdot \sigma_1,$ wherein $G_5$ is the mass flow rate of the first component of the liquid phase, and $G_6$ is the mass flow rate of the second component of the liquid phase.

The above objects are accomplished by an apparatus for carrying out the method for measuring mass flow rate of individual components of two-phase medium according to the invention comprising a sealed housing accommodating a hollow pendulum supported therein, oscillations being imparted to the pendulum by means of an electromagnetic coil mounted on the housing, an electromagnetic coil for converting oscillation velocity of the pendulum into an electric signal which is also mounted on the housing, an amplifier having an output connected to the electromagnetic coil imparting oscillations and an input connected to the electromagnetic coil for converting oscillation velocity, an automatic gain control unit having an input connected to the electromagnetic coil for converting oscillation velocity and an output connected to a conrol input of the amplifier, a first voltage-to-frequency converter having an input connected to the output of the automatic gain control unit, a first zero corrector and a first conversion transconductance corrector connected to the first voltage-to-frequency converter whose output frequency signal is proportional to the mass flow rate of a two-phase medium being measured, a frequency-to-voltage converter, a second voltage-to-frequency converter having an input connected to the output of the frequency-to-voltage converter, a second zero corrector connected to said second voltage-to-frequency converter; and a second conversion transconductance corrector connected to the second voltage-to-frequency converter whose output frequency signal is proportional to the density of the two-phase medium being measured, and a pressure sensor for measuring the pressure of the two-phase medium in the housing, the sensor being connected to the inner space of the housing by means of a pipe.

The apparatus preferably comprises an actual volumetric gas content sensor for measuring the actual volumetric gas content of a three-component medium in the inner space of the pendulum, the sensor being mounted on the housing and having an output connected to the input of a third voltage-to-frequency converter whose output signal is proportional to the actual gas content.

The passage of the pendulum is preferably of an elongated cross-sectional configuration with the larger dimension in the direction normal to the plane of the pendulum oscillations, the cross-sectional dimension in the plane of oscillations, mass of the pendulum and stiffness thereof being selected in such a manner that the ratio of the resonance frequency of the pendulum to the fundamental frequency of the medium being measured in the inner space of the pendulum in the plane of oscillations is below 0.1.

The passage of the pendulum is preferably of circular cross-section, the diameter $d$ of the circle, mass of the pendulum and stiffness thereof being selected in such a manner that the ratio of the resonance frequency of the pendulum to the fundamental frequency of the medium being measured in the inner space of the pendulum in the plane of oscillations is below 0.1.

The method and apparatus for measuring the mass flow rate of individual components of a two-phase gas-liquid medium allow for determining the mass flow rate of each individual component of a two-phase three-component mixture. In particular, the method according to the invention permits determining the content of oil, water and produced gas in unseparated oil thereby eliminating the step of separating oil-water-gas mixtures in a measuring separator which is now a widely used practice. The method according to the invention enables measurements over a wide dynamic range. The apparatus according to the invention makes it possible to perform measurements of mass flow rate of viscous mixtures having a viscosity of up to 1000 cSt. The absence of rotatable parts obstructing the flow of a medium being measured in the apparatus according to the invention simplifies the construction of the vibration flow meter and improves the reliability of measurements. The apparatus according to the invention enables a considerable reduction of the number in control and measuring instruments used for measuring the mass flow rate of a two-phase media.

The invention will now be described with reference to a specific embodiment thereof illustrated in the accompanying drawings, in which.

The apparatus for carrying out the method for measuring the mass flow rate of individual components of a two-phase medium according to the invention comprises a sealed housing 1 (FIG. 1) accommodating a hollow pendulum 2 supported therein. The pendulum 2 consists of three parts: a solid upper part 3 which is used for attachment of the pendulum 2 to the housing 1, a thin-walled intermediate part 4 used as an elastic suspension, and an enlarged lower part 5 used as weight.

Figures 1, 3:
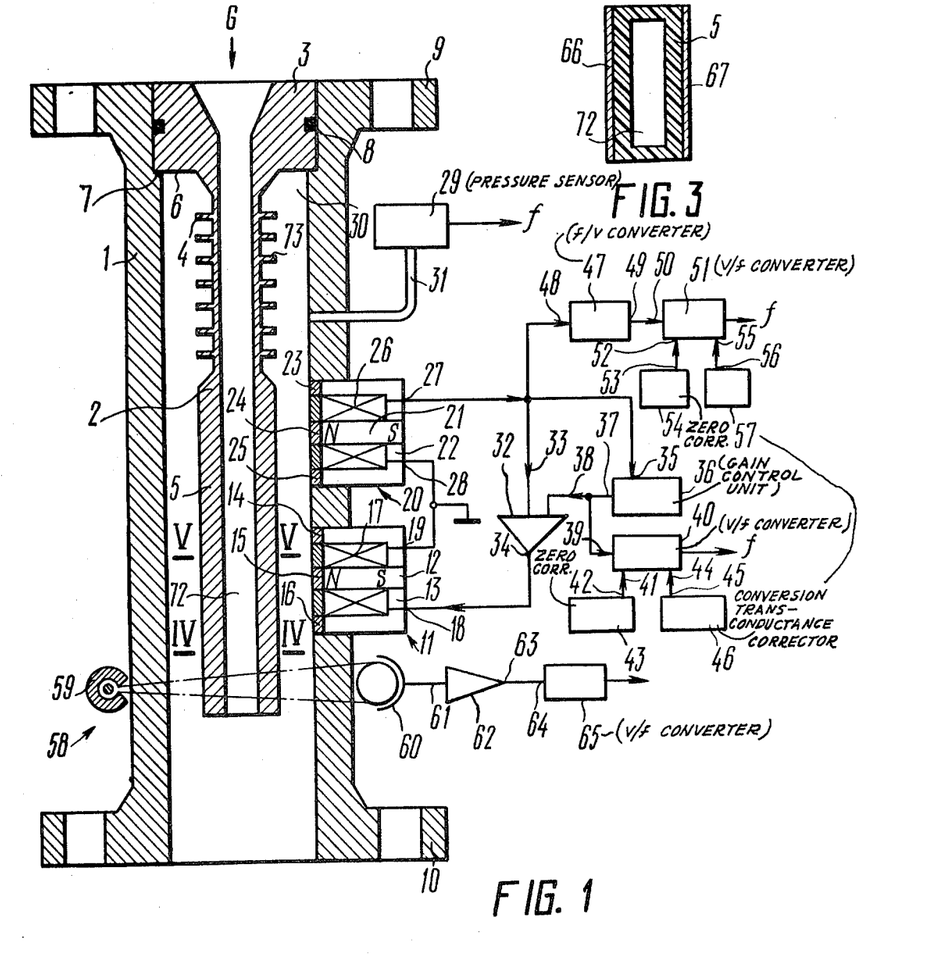
FIG. 1 shows a longitudinal section of a converter of parameters of a two-phase gas-liquid medium being measured and a principal block diagram of a circuit for measuring signals from the converter in an apparatus for carrying out the method for measuring the mass flow rate of individual components of two-phase medium according to the invention.
FIG. 3 is a transverse sectional view of the pendulum taken along the line III—III in FIG. 2.

The upper part 3 of the pendulum 2 is supported, along the periphery of the lower end face 6, by an annular projection 7 of the housing 1. In this embodiment, the upper part 3 of the pendulum 2 is provided with a sealing ring 8.

The upper and lower parts of the housing 1 have flanges 9 and 10, respectively, which are used for connecting the housing 1 to a pipeline.

Mechanical oscillations are imparted to the pendulum 2 by means of an electromagnet 11 which has a central rod 12 of a core 13 made of a magnetically hard material. The electromagnet 11 is mounted on the housing 1 which is made of a nonmagnetic amaterial. In this embodiment, the housing 1 has inserts 14, 15 and 16 located beneath the electromagnet 11 which comprise plates of a magnetically soft material, such as ARMCO so as to reduce magnetic stray fields. A coil 17 of the electromagnet 11 has two conductors 18 and 19.

The apparatus also comprises an electromagnet 20 for converting the oscillation velocity of the pendulum 2 into an electric signal. A central rod 21 of the core 22 of the electromagnet 20 is made of a magnetically hard material. The electromagnet 20 is also mounted on the housing 1. In this embodiment, the housing 1 has inserts 23, 24 and 25 of a magnetically soft material. A coil 26 of the electromagnet 20 has two conductors 27 and 28.

The apparatus also has a pressure sensor 29 for measuring pressure in the inner space 30 of the housing 1. The pressure sensor 29 is connected to the inner space 30 of the housing 1 by means of a pipe 31. The pipe 31 is connected to the housing 1 by any appropriate known method, such as welding. Any known sensor generating an electric frequency output signal may be used as the pressure sensor 29.

The block diagram for measuring signals from the converter of the apparatus according to the invention comprises a variable gain amplifier 32 which is used for amplification of the output signal from the electromagnet 20 converting the oscillation velocity of the pendulum 2. The amplifier 32 is built around a known analog multiplier circuit (cf. V. L. Shilo, Linear Integrated Circuits in Radioelectronical Equipment (Linejnye integralnye skhemy v radioelectronnoj apparature), Moscow, Sovetskoe radio Publishers, 1974, P. 163).

An input 33 of the amplifier 32 is connected to the conductor 27 of the electromagnet 20 for converting oscillation velocity. An output 34 of the amplifier 32 is connected to the conductor 18 of the electromagnet 11 for imparting oscillations.

The input 33 of the amplifier 32 is connected to an input 35 of an automatic gain control unit 36. An output 37 of the iunit 36 is connected to a control input 38 of the amplifier 32 and to an input 39 of a first voltage-to-frequency converter 40. An output frequency signal of the converter 40 is represneted by alternating current at a frequency which is proportional to the mass flow rate of the two-phase medium being measured. The input 41 of the converter 40 is connected to an output 42 of a zero corrector 43 which is built around a known circuit (cf. V. L. Shilo, Linear Integrated Circuits in Radioelectronical Equipment (Linejnye integralnye skhemy v radioelectronnoj apparature), Moscow, Sovetskoe radio Publishers, 1964, p. 128, FIG. 4. 13a).

The input 44 of the converter 40 is connected to an output of a conversion transconductance corrector 46 which is essentially a potentiometer.

The block diagram of the apparatus according to the invention also includes a frequency-to-voltage converter 47 which is used to convert the oscillation frequency of the pendulum 2 into voltage and is built around a known circuit (cf. P. V. Novitskij, V. G. Knorring, V. S. Gutnikov, Digital Instruments with Frequency Sensors (Tsyfrovye pribory s chastotnymi datchikami, Energija Publishers, Leningrad, 1970, pp. 275-276, FIGS. 10-32). An input 48 of the converter 47 is connected to the conductor 27 of the electromagnet 20 for converting the oscillation velocity.

An output 49 of the frequency-to-voltage converter 47 is connected to an input 50 of a second voltage-to-frequency converter 51.

An output frequency signal of the converter 51 is represented by alternating current at a frequency which is proportional to an average density $\rho$ of the two-phase medium being measured.

An input 52 of the converter 51 is connected to an output 53 of a zero corrector 54 which is identical with the zero corrector 43. An input 55 of the converter 51 is connected to an output of a conversion transconductance corrector 57 which is identical with the conversion transconductance corrector 46.

For determination of the mass flow rate of each individual component of a two-phase three-compont medium, the apparatus is provided with a sensor 58 for measuring actual volumetric gas content. In this embodiment, the sensor 58 comprises a radioisotope actual gas content meter (cf. V. L. Mamaev, G. A. Odisharin, Gas Dynamics of Gas-Liquid Mixtures in Pipes (Gasodinamika gazozhidkostnykh smesej vtrubakh), Nedra Publishers, Moscow, 1969, pp. 92. 95).

The sensor comprises a radioactive source 59 arranged on the housing 1 and a radiation intensity meter 60 located at a diametrically opposite side of the housing 1.

An output signal from the meter 60 is fed to an input 61 of an amplifier 62 having an integrating circuit at the output thereof. An output 63 of the amplifier 62 is connected to an input 64 of a third voltage-to-frequency converter 65.

An output frequency signal of the converter 65 is proportional to actual gas content.

Alternatively, the sensor 58 for measuring actual volumetric gas content may comprise a capacitance converter of actual gas content (cf. Hoodendorn C.I., Chemical Eng. Sc., No. 9, No. 4, 1959).

In the latter case, the lower part 5 of the pendulum 2 (FIG. 2) is made of an insulating material. Two metal plates 66 and 67 (FIG. 3) are fixed to the lower part 5 of the pendulum to form the plates of the capacitance converter. Conductors 68 and 69, respectively, are connected to the plates 66 and 67 (FIG. 2) which are also connected to a secondary instrument 70 for measuring the capacity.

Figures 2, 4, 5:
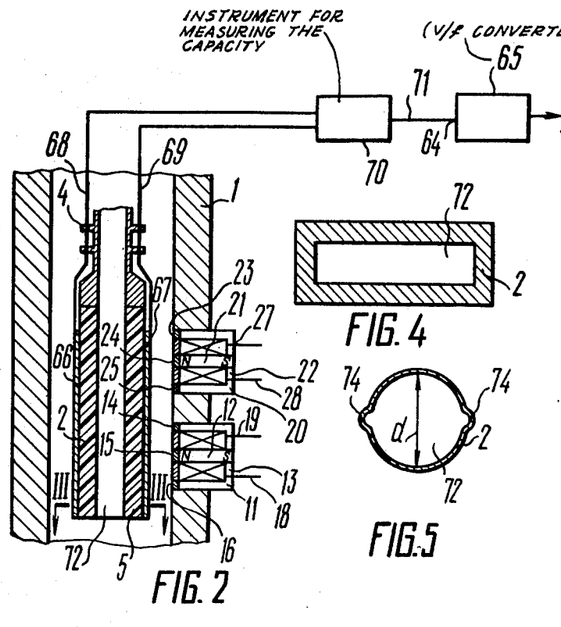
FIG. 2 shows an embodiment of a pendulum of the apparatus according to the invention.
FIG. 4 is a transverse sectional view of the pendulum taken along the line IV—IV in FIG. 1.
FIG. 5 is a transverse sectional view of another embodiment of the pendulum taken along the line V—V in FIG. 1.

An output 71 of the secondary instrument 70 is connected to the input 64 of the third voltage-to-frequency converter 65.

In this embodiment, a passage 72 (FIG. 4) of the pendulum 2 has an elongated cross-sectional configuration with the larger dimension in the direction normal to the plane of the pendulum oscillations and represents a rectangle. It should be noted that the cross-sectional dimension in the plane of the pendulum oscillations and stiffness of the thin walled part 4 (FIG. 1) of the pendulum 2 are selected in such a manner that the ratio of resonance frequency of the pendulum 2 to fundamental frequency of the medium being measured in the inner space 72 of the pendulum 2 in the plane of oscillations of the pendulum 2 is below 0.1.

The thin-walled intermediate part 4 (FIG. 1) of the pendulum 2 is provided with ridges 73 for reducing the deformation of the intermediate part 4 of the pendulum 2 under the action of a pressure difference at the pendulum 2 during the passage of flow therethrough.

Alternatively, the passage 72 of the pendulum 2 may be of circular cross-section (FIG. 5), the diameter $d$ of the circle, the mass of the pendulum 2 and stiffness thereof being selected in such a manner that the ratio of the resonance frequency of the pendulum to the fundamental frequency of the medium being measured in the inner space of the pendulum in the plane of oscillations of the pendulum is below 0.1.

The thin-walled intermediate part 4 of the pendulum 2 is provided with two longitudinally extending diametrically opposite projections 74 intended to create an anisotropy of bending stiffness of the intermediate part 4 (FIG. 1) of the pendulum 2.

The method according to the invention will be better understood after referring to the following simplified theoretical background of the invention.

The differential equation for moments of the oscillating pendulum 2 is the following:

$$I_1 \ddot{\theta} + (b + l^2 G)\dot{\theta} + k \cdot l \cdot \theta = M, \quad (1)$$

wherein $$I_1 = I_2(1 + \frac{I_3}{I_2}) \quad (2)$$

$I_1$ is moment of inertia of the pendulum 2 filled with the medium being measured,
$I_2$ is moment of inertia of the pendulum 2,
$I_3$ is moment of inertia of the medium in the inner space of the pendulum 2,
$l$ is length of the pendulum 2,
$b$ are proper energy losses in the oscillating pendulum 2,
$G$ is mass flow rate of two-phase medium which, in case of gas-liquid medium is a total of mass flow rate of gas $G_1$ and mass flow rate of the liquid phase $G_2$, that is $$G = G_1 + G_2 \quad (3)$$

$k$ is bending stiffness of the pendulum 2,
$\theta$ is rotation angle of the pendulum 2,
$\dot{\theta}$ is speed of variation of the rotation angle of the pendulum 2,
$\ddot{\theta}$ is acceleration of the rotation angle of the pendulum 2.

Oscillation velocity $\dot{\theta}$ of the pendulum 2 is converted int a proportional electric signal equal to $K_1 \cdot \dot{\theta}$, wherein $K_1$ is coefficient of electromagnetic linkage of the electromagnet 20 for converting oscillation velocity with the pendulum 2, and moment M developed by the electromagnet 11 for imparting oscillations is expressed as follows:

$$M = K \cdot K_1 \cdot \dot{\theta} \quad (4)$$

wherein $K$ is gain of the amplifier 32 coupling the electromagnet 20 for converting oscillation velocity to the electromagnet 11 for imparting oscillations.

By substituting (4) into (2) obtain:

$$I_1 \cdot \ddot{\theta} + (b + l^2 G - KK_1) \cdot \dot{\theta} + k \cdot \theta = 0 \quad (5)$$

Under steady oscillation conditions, where the energy applied to the pendulum 2 is equal to the energy absorbed by the pendulum 2 during the passage of the medium being measured therethrough, the following condition is fulfilled:

$$(b + l^2 G_1 - KK_1) \cdot \dot{\theta} = 0 \quad (6)$$

wherefrom $$b + l^2 \cdot G_1 - KK_1 = 0 \quad (7)$$

Oscillations of the pendulum 2 filled with the medium being measured occur at resonance frequency:

$$\omega^2 = \frac{k}{I_1} = \frac{k}{I_2(1 + \frac{I_3}{I_2})} = \frac{k}{I_2(1 + \frac{m_2}{m_2})} = \quad (8)$$

$$\frac{\omega_o^2 \cdot 1}{1 + \frac{\rho}{\rho_7} \cdot \frac{S}{S_7}} = \omega_o^2 \frac{1}{1 + K_2 \cdot \rho}$$

wherein $$\omega_o^2 = k/I_2 \quad (9)$$

is fundamental frequency of the empty pendulum 2,
$\rho$ is density of the medium being measured,
$\rho_7$ is density of the pendulum material,
$S$ is cross-sectional area of the passage 72 of the pendulum 2,
$S_7$ is cross-sectional area of the pendulum 2,
$K_2$ is proportionality factor, $$K_2 = \rho_7 \cdot S/S_7 \quad (10)$$

$m_3$ is mass of a unit of length of the pendulum 2 filled with the medium being measured,
$m_2$ is mass of a unit of length of the empty pendulum 2.

Equation (8) may be solved with respect to density of the medium being measured and transformed into the following form:

$$\rho = \frac{1}{K_2} \left( \frac{f_o^2}{f^2} - 1 \right) \quad (11)$$

wherein
$f_o = \omega_o/2\pi$,
$f = \omega/2\pi$

Equation (11) expresses the relationship of the average density of a two-phase medium vs. measured frequency $f$.

From equation (7) obtain:

$$G = (K/b_1) - (a/b_1),$$

wherein
$a = (b/K_1)$,
$b_1 = (l^2/K_1) \quad (12)$

Therefore, the mass flow rate of a mixture is proportional to the gain of the amplifier 32 which couples the electromagnet 20 for converting oscillation velocity to the electromagnet 11 for imparting oscillations. The gain of the amplifier 32 is equal to the ratio of the output current driving the electromagnet 11 for imparting oscillations to a voltage applied to the input 33 of the amplifier 32 from the electromagnet 20 for converting oscillation velocity:

$$K = i_1/U_1 \quad (13)$$

It is obvious that, for obtaining linear dependence of G on k, the value of $U_1$ should be maintained constant.

Figure 6:
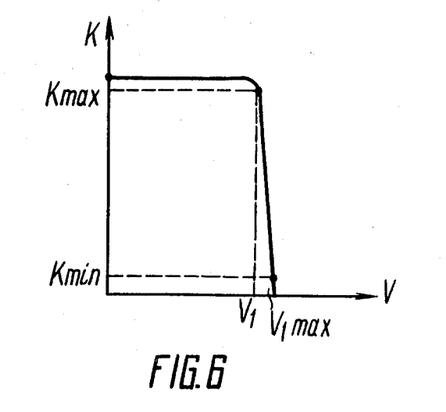
FIG. 6 is a curve showing the amplifier response, wherein amplifier gain is plotted on the ordinates and rectified voltage from the electromagnets of the converter of oscillation velocity of the apparatus according to the invention is plotted on the abscissa.

The value of $U_1$ is maintained constant by varying the value of current $i_1$ which is effected by controlling the gain k of the amplifier 32. The amplifier 32 has the response shown in FIG. 6 which is described by the following equation:

$$K = K_{max}(1 - S_o \cdot V_2) \quad (14)$$

wherein
$V_2$ is gain control voltage of the amplifier 32, $K_{max}$ is maximum gain K of the amplfier 32,
$S_o$ is steepness of the response curve.

A voltage $$V_2 = K_5(V_1 - V_3) \quad (15)$$

wherein $K_5$ is gain of the automatic gain control unit 36,
$V_1$ is rectifier voltage $U_1$ taken from the electromagnet 20 for converting oscillation velocity,
$V_3$ is comparison voltage of the automatic gain control unit 36.

By making equal the expressions (12) and (14) obtain that $$S_o \cdot V_2 = 1 - A - B \cdot G, \quad (16)$$

wherein $A = (a/K_{max})$, $B = (b_1/K_{max})$

When the pendulum is not filled with a medium to be measured $$G = 0, \ V_1 = V_{1\,max}, \ V_2 = V_{2\,max} \quad (17)$$

wherefrom $$S_0 \cdot V_{2\,max} = 1 - A$$

By subtracting (16) from (17) obtain that $$\Delta V_2 = V_{2\,max} - V_2 = (B/S_o) \cdot G \quad (18)$$

wherefrom $$G = (S_oB) \cdot \Delta V_2 = K_3 \cdot \Delta V_2, \quad (19)$$

that is mass flow rate G of a two-phase medium is proportional to deviation of the gain control voltage of the amplifier 32.

Since $$G = G_1 + G_2 \quad (3)$$

and $$G_1 = \rho_1 \cdot Q_1, \ G_2 = \rho_2 \cdot Q_2, \ a_1 = (Q_2/Q_1) \quad (20)$$

the expression for the liquid phase flow rate may be written in the following form:

$$G_1 = K_3 \frac{\Delta V_2}{1 + \dfrac{G_2}{G_1}} = K_3 \frac{\Delta V_2}{1 + a_1 \cdot \dfrac{\rho_2}{\rho_1}} \quad (21)$$

Therefore, the basic formulae (11) and (21) are obtained for determination of mass flow rate of individual components of two-phase media.

The most simple case of a two-phase gas-liquid medium is a medium containing two single-component phases: one liquid and one gas. Density of such medium is determined by the formula:

$$\rho = \rho_1 \cdot (S_1/S) + \rho_{21} \cdot (S_2/S) \quad (22)$$

wherein $\rho_{21} = \rho_2 \cdot P_1$ is gas density under pressure $P_1$,
$P_1 = (P_2/P_3)$ is a dimensionless quantity indicating how many times the absolute pressure within the housing is greater than atmospheric pressure $P_3$, $P_2$ is gauge pressure. $S_1$ and $S_2$ are cross-sectional areas of the pendulum occupied by liquid and gas, respectively, under pressure $P_1$.

It is obvious that $$S_1 + S_2 = S \quad (23)$$

Thus, equation (22) may be transformed to read $$\rho = \rho_1 - (\rho_1 - \rho_2 \cdot P_1) \cdot (S_2 S_1) = \rho_1 - (\rho_1 - \rho_2 \cdot P_1 1 \cdot \varphi \quad (24)$$

wherein $\phi$ is the actual volumetric gas content.

By solving equation (24) with respect to $\alpha$ obtain:

$$\varphi = (\rho_1 - \rho)/(\rho_1 - \rho_2 \cdot P_1) \quad (25)$$

There is an empirical relationship of actual gas content value vs. flow rate gas content $\beta$ for the most frequently occurring structure of gas-liquid mixture which is characterized by the dependence of $\varphi$ on $\beta$ and Fr number (cf. V. A. Mamaev, G. E. Odisharin, N. I. Semenov, A. A. Tochigin, Hydrodynamics of Gas-Liquid Mixtures in Pipes (Gidrodinamika gazozhidkostnykh smesej v trubakh), Nedra Publishers, 1969, p. 146, FIGS. 56 and 57).

$$\varphi = 0.81\beta (1 - e^{-2.2\sqrt{F_r}}) \quad (26)$$

It follows from the expression (26) that with sufficiently high Froude numbers for air-water mixtures, actual gas content $\varphi = 0.81\beta$ and does not depend on the Froude number for the mixtures, that is self-similar flow occurs during the passage of a two-phase medium through the pendulum 2.

In case of non-ascendant and horizontal flows, self-similar flow conditions are obtained with Froude numbers $F_r \geq 4$, and in case of descendant flows, depending on the nature of the two-phase medium, self-similar flow conditions occur at higher Froude numbers.

The construction of the pendulum 2 in the apparatus according to the invention provides for independence of $\varphi$ on Fr number over the entire measuring range so that $$\varphi = K_6 \cdot \beta = K_6 \cdot (Q_{21}/Q) \quad (27)$$

wherein $K_6$ is coefficient which is to be experimentally established for a given construction of the pendulum 2 and for a specific medium being measured, $Q_{21} = Q_2/P_1$ — volumetric flow of the gaseous phase K at the pressure $P_1$.

Taking into account that $$Q = Q_1 + Q_{21} \quad (28)$$

and $a_1 = (Q_2/Q_1)$ obtain $$\alpha = \rho_1 \cdot \frac{\varphi}{K_6 - \varphi} \quad (29)$$

Among the terms of equal (25) density of liquid $\rho_1$ and density of gas $\rho_2$ are known, $P_2$ is measured, density of the mixture is determined from equation (11), $\varphi$ is determined from deviations of the values of $f_o$ and $f$, and then, from the expression (25), and $\alpha$ is determined from formula (29).

After finding out $a_1$ and substituting it into (21), the mass flow rate of liquid phase $G_1$ of the medium being measured can be determined. The volumetric flow rate of the gaseous phase is determined by the formula:

$$Q_2 = a_1 \cdot Q_1 = a_1 \cdot G_1/\rho_1 \quad (30)$$

For products of oil wells which represent an oil-water-gas medium wherein the liquid phase consists of two components, water and oil, the ratio of oil to oil gas is a constant value for a given oil field and is expressed by the formula:

$$Q_2 = a \cdot Q_3 \tag{31}$$

wherein $a$ is the gas factor. Due to the fact that the gas factor is unchanged with time and is known for given measurement conditions, the mass flow rate of each individual component of an oil-water-gas medium can be determined without performing any additional measurements.

After determination of density $\rho$ of the medium by formula (11), the water content ratio may be found. For an oil-water-gas medium, the following formulae can be used:

$$\rho_1 = \rho_3 + (\rho_4 - \rho_3) \cdot \sigma \tag{32}$$

$$a_1 = a(1 - \sigma) \tag{33}$$

wherein $\rho_3$ is density of oil, $\rho_4$ is density of water, $\sigma$ is water content ratio.

Since the value of $\rho$ depends on the value of water content ratio and is an unknown quantity, obtain, by substituting (25) in (29):

$$a_1 = P \frac{1 - \frac{\rho}{\rho_1}}{K_6(1 - P \cdot \frac{\rho_2}{\rho_1}) - (1 - \frac{\rho}{\rho_1})} \tag{34}$$

After substitution of value of $\rho_1$ from (32) and of $a_1$ from (33) in (34), a quadratic equation is obtained from which water content ratio is to be found:

$$\tau = 1 - \frac{(a_1 - K_6 b_2)\frac{a}{P} - 1 + \sqrt{[(a_1 - K_6 b_2)\frac{a}{P} - 1]^2 + 4[\frac{a}{P}(1 - K_6)a_1]}}{2 \cdot \frac{a}{P}(1 - K_6)} \tag{35}$$

wherein $$a_1 = (\rho_4 - \rho)/(\rho_4 - \rho_3), \quad b_2 = (\rho_4 - \rho_2 \cdot P)/(\rho_4 - \rho_3) \tag{36}$$

Now, the flow rate of components of an oil-water-gas medium may be determined from the following formulae:

$$Q_3 = (G_3/\rho_3) = (G_1/\rho_1)(1 - \sigma) \text{ volumetric flow rate of oil} \tag{37}$$

$$Q_4 = (G_4/\rho_4) = (G_1/\rho_1) \cdot \sigma \text{ volumetric rate of water} \tag{38}$$

$$Q_2 = a \cdot Q_3 = a \cdot G_3/\rho_3 \text{ volumetric flow rate of gas} \tag{39}$$

The most complicated is the determination of flow rates of individual components of a two-phase medium in the case where the liquid phase consists of two components and the ratio of all three components may arbitrarily vary during the measurement.

In such applications actual gas content is to be additionally measured.

Average density of a medium is determined from equation (11).

The following relationship stays for densities of the liquid phase and vs. densities of components thereof:

$$\rho_1 \cdot S_1 = \rho_5 \cdot S_5 + \rho_6 \cdot S_6 = \rho_5 \cdot S_5 + \rho_6(S_1 - S_5) \tag{40}$$

wherein $\rho_5$ and $\rho_6$ are densities of first and second components of the liquid phase, respectively, and $\rho_6 > \rho_5$, $S_5$ and $S_6$ ar portions of the cross-section of the pendulum 2 occupied by the first and second components, respectively.

Relative contents of the first component in the liquid phase is determined by the expression $$\sigma_1 = (S_5/S_1) \tag{41}$$

then equation (32) may be rewritten as follows:

$$\rho_1 = \rho_5 + (\rho_6 - \rho_5) \cdot \sigma_1 \tag{42}$$

By substituting expression (42) in (24) $\sigma_1$ may be found from the following:

$$\tau_1 = \frac{Q_5}{Q_1} = \frac{\rho_5(1 - \sigma) + \rho_2 \cdot \varphi - \rho}{(\rho_6 - \rho_5)(1 - \varphi)} \tag{43}$$

To found $a_1$, $G_1$, $G_5$, $G_6$ and $Q_2$, expressions (35), (21), (37), (38), (30) are used with substitution of $\sigma_1$ for $\sigma$, $a1$ for $a$, $G_1$ and $\rho$ for $G_3$ and $\rho_3$.

The basic relationships determining the operation of the apparatus for carrying out the method according to the invention are true, if a number of conditions are fulfilled. The equation (1) is solved with the assumption that a gas-liquid medium is a quasi-homogeneous nonelastic liquid with variable density. This assumption is well-founded since the measurements of voltage $\Delta V_2$ proportional to the value of the mass flow rate of a two-phase medium and frequency proportional to average density of the medium are performed during a finite time interval, and the quantities used in the derivation of the equation have the values average over this time interval.

Linear dependence of actual and flow rate gas contents holds true or applies where a predetermined flow rate is maintained, if the pendulum cross-sectional area is selected in such a manner that there occurs a self-similar two-phase flow over the entire range of measurement of the mass flow rate of a two-phase medium.

In order to comply with the condition of non-compressibility of liquid, a predetermined ratio of pendulum oscillation frequency and fundamental frequency of gas-liquid medium in the inner space of the pendulum should be maintained which is achieved by selecting predetermined shape and dimensional proportioning of the pendulum on the basis of the following considerations.

Gas-liquid medium filling the pendulum cavity cannot be attributed to the category of non-compressible media due to the presence of gas therein. Elasticity of the medium results in the appearance therein of oscillations normal to the flow direction. Therefore, the pendulum and elastic medium filling it form two interrelated oscillating systems. The linkage factor of two systems is determined by the ratio of their fundamental frequencies, the elasticity of a two-phase medium the viscosity thereof.

In order to impart oscillations to a two-phase medium, a certain energy should be applied. This additional energy introduces an error into the value of the measured mass flow rate. This energy is imparted to particles of the medium from the pendulum walls. Oscillations in a gas-liquid medium propagate at the acoustic velocity and depend on the value of flow rate gas content $$\beta = (Q_{21}/Q) \quad (44)$$

Oscillation frequency of a two-phase medium may be approximately found from the following expression:

$$\omega = (C_7/\Delta) \quad (45)$$

wherein $C_7$ is acoustic velocity in the medium, $\Delta$ is free path length of acoustic wave which is determined, in this case, by the cross-sectional dimension of the inner space of the pendulum.

The pendulum oscillations constitute an external disturbant force for the medium filling it. The amplitude of the oscillations of the medium depends on the frequency ratio of the pendulum and medium and on the decrement of the medium. If the ratio $$(\omega_{pendulum}/\omega_{medium}) < 0.1$$

then the relative amplitude of oscillations of a two-phase medium becomes close to unity so that energy taken off by the oscillating medium is minimized. With an increased viscosity of the medium, this effect is achieved at higher ratios of $\omega_{pendulum}$ to $\omega_{medium}$.

If the condition $(\omega_{pendulum}/\omega_{medium})$ is fulfilled for minimum acoustic velocities in a two-phase medium (about 18–25 m/s), in all other cases the ratio $\omega_{pendulum}/\omega_{medium}$ will be still lower. Hence, the influence of the gas-liquid medium on the losses in the pendulum and on the error in measurements of the mass flow rate of the medium will be smaller. This condition may be fulfilled by using a pendulum in which the inner passage 30 cross-section of the pendulum coinciding with the plane of oscillations is selected such as to comply with the condition $\omega_{pendulum}/\omega_{medium} < 0.1$ and the ratio of the said size to the width of the passage should provide for self-similar flow conditions over a desired flow rate range.

Anisotropy of bending stiffness due to which the elastic suspension of the pendulum has minimum stiffness in the plane extending through the housing axis and centers of the electromagnets is ensured by the pendulum shape which is made of a rigid rectangular tube.

The pendulum may be of circular cross-section. With this construction of the pendulum, anisotropy of bending stiffness of the elastic suspension of the pendulum is provided for due to the presence of two longitudinally extending projections on diametrically opposite passage walls. This shape of the pendulum is used in those cases where the diameter of the pendulum passage provides for fulfillment of both conditions: $\omega_{pendulum}/\omega_{medium} < 0.1$ and self-similar flow conditions, or where the pendulum cross-section has baffles provided to comply with these conditions.

The apparatus according to the invention operates in the following manner:

A flow of a two-phase two-component medium, which represents a gas-liquid mixture, is fed through the hollow pendulum 2. Undamped mechanical oscillations are imparted to the pendulum 2, and to these mechanical oscillations correspond electric oscillations in the electric circuit of the electromechanical oscillator including the electromagnet 11 for imparting oscillations, the pendulum 2, the electromagnet 20 for converting oscillation velocity and the automatically controlled amplifier 32.

Oscillations developed in the circuit occur at a frequency which is equal to the fundamental frequency of the pendulum 2 filled with the two-phase medium being measured. The pendulum 2 oscillates to interact with the permanent magnetic field of the electromagnet. As a result, an EMF is induced in the coil 26 of the electromagnet 20 which is proportional to oscillation velocity of the pendulum 2.

The alternating EMF $U_1$ is fed to the input 33 of the amplifier 32. Amplified signal is fed from the output 34 of the amplifier 32 to te input 18 of the coil 17 of the electromagnet 11 for imparting oscillations.

The provision of decreasing characteristic of the amplifier 32 (FIG. 6) enables steady oscillations of the pendulum 2. The amplitude of oscillation velocity of the pendulum 2 is set-up by the setting voltage $V_2$ to which the voltage $U_1$ is continuously compared.

Automatic control unit 36 maintains the initial value of the amplitude of oscillation velocity of the pendulum 2 at a constant level. The flow of medium passing through the pendulum 2 takes off a part of the energy required to maintain the oscillation amplitude unchanged. Thus, the automatic gain control unit 36 generates a signal directed to increase the gain of the amplifier 32 by applying thereto a voltage $V_1 = V_3 - V_2$. The excitation current flowing in the coil 17 of the electromagnet 11 for imparting oscillations is accordingly increased.

The mass flow rate of liquid medium is determined by the value of the control voltage $V_2$.

The control voltage $V_2$ received from the output of the automatic gain control unit 36 proportional to the mass flow rate is fed to the input 39 of the voltage-to-frequency converter 40 having the zero corrector 43 and the conversion transconductance corrector 46. Due to the provision of these correctors, it is possible to set-up zero or zero adjust and adjust the transconductance or steepness for any pendulums independent of manufacturing deviations of parameters thereof so that all pendulums will have identical conversion characteristics.

The voltage $U_1$ from the electromagnet is fed to the input 48 of the frequency-to-voltage converter 47 and then, from the output 47 thereof, to the input 50 of the voltage-to-frequency converter 51 having the zero corrector 54 and the conversion transconductance corrector 57.

Double frequency voltage conversion is necessary to obtain identical conversion characteristics for different pendulums. The output frequency of the voltage $U_1$ is proportional to the average density of the two-phase medium being measured.

At the same time, the pressure in the inner space 30 of the sealed housing 1 is measured which is equal to the pressure at the outlet of the pendulum 2. The measurement is effected by means of the pressure sensor 29 having a frequency output signal. With the known pressure value, the parameters of the gaseous phase may be reduced to the measurement conditions.

In order to determine flow rates of individual components of a two-phase medium in which the liquid phase consists of two relatively soluble components, actual gas content should be additionally measured. The gas content is measured by means of a radioactive sensor 58. The intensity of radiaton of the source 59 of the sensor 58 is proportonal to the actual gas content in the plane of the source 59.

The output signal of the sensor, which is represented by frequency, is proportional to the actual gas content of the medium being measured.

The method for measuring the mass flow of individual components of a two-phase gas-liquid medium according to the invention and the apparatus for carrying out this method enable the determination of the mass flow of each component of a two-phase two-component medium and of a two-phase three-component medium. Thus, the method according to the invention allows for measuring the content of oil, water and lateral gas in non-separated oil thereby eliminating the process of separating oil-water-gas mixtures in a measuring separator. The method according to the invention enables the measurements over a wide dynamic range, as well as measurements of the mass flow rate of viscous mixtures with a viscosity of up to 1000 cSt. The absence of rotating parts in the construction of the apparatus which could obstruct the passage of flow of a medium to be measured simplifies the construction of the vibration flow meter and improves the reliability of measurements. The apparatus according to the invention ensures a considerable reduction in the number of control and measuring instruments for measuring the mass flow rate of two-phase media.

What is claimed is:

1. An apparatus for measuring mass flow rate of individual components of two-phase medium comprising: a sealed housing having supported therein a hollow pendulum; a first electromagnetic coil for imparting oscillations to said pendulum, and a second electromagnetic coil for converting oscillation velocity of said pendulum into an electric signal, said first and second coils being mounted on said housing; an amplifier having an input connected to the second electromagnetic coil, which converts the oscillation velocity of the pendulum and a control input, the output of said amplifier being connected to said first electromagnetic coil for imparting oscillations; an automatic gain control unit having an input connected to said second electromagnetic coil for converting oscillation velocity and an output connected to said control input of said amplifier; a first voltage-to-frequency converter having an input connected to said output of said automatic gain control unit; a first zero corrector connected to said first voltage-to-frequency converter; a first conversion transconductance corrector connected to said first voltage-to-frequency converter whose output frequency signal is proportional to mass flow rate of a two-phase medium being measure; a frequency-to-voltage converter having an input and output; a second voltage-to-frequency converter having an input connected to said output of said frequency-to-voltage converter; a second zero corrector connected to said second voltage-to-frequency converter; a second conversion transconductance corrector connected to said second voltage-to-frequency converter whose output frequency signal is proportional to density of the two-phase medium being measured; and a pressure sensor for measuring pressure of the two-phase medium in the inner space of the housing.

2. An apparatus according to claim 1 comprising: an actual volumetric gas content sensor for measuring actual volumetric gas content of a three-component medium in the inner space of the pendulum, said sensor having an output and being mounted on said sealed housing; a third voltage-to-frequency converter whose output frequency signal is proportional to actual gas content, and an input of said third converter being connected to said output of said actual volumetric gas content sensor.

3. An apparatus according to claim 2, wherein the pendulum passage is of circular cross-section, the diameter of the circle, mass of the pendulum and stiffness thereof being selected in such a manner that the ratio of resonance frequency of the pendulum to fundamental frequency of the medium being measured in the inner space of the pendulum in the plane of oscillations thereof is below 0.1.

4. An apparatus according to claim 2, wherein the pendulum passage has an elongated cross-sectional configuration in the direction normal to the plane of oscillations of the pendulum, the dimension of the cross-section in the plane of oscillations, mass of the pendulum and stiffness thereof being selected in such a manner that the ratio of resonance frequency of the pendulum to fundamental frequency of the medium being measured in the inner space of the pendulum in the plane of oscillations thereof is below 0.1.

5. An apparatus according to claim 1, wherein the passage of the pendulum has an elongated cross-sectional configuration with the larger dimension in the direction normal to the plane of the pendulum oscillations, the dimension of the cross-section in the plane of oscillations, mass of the pendulum and stiffness thereof being selected in such a manner that the ratio of resonance frequency of the pendulum to fundamental frequency of the medium being measured in the inner space of the pendulum in the plane of the pendulum oscillations is below 0.1.

6. A method for measuring mass flow rate of individual components of two-phase gas-liquid medium comprising: feeding a flow of a two-component medium to be measured through a hollow pendulum; imparting undamped mechanical oscillations to the pendulum; maintaining oscillation velocity of the pendulum at a constant level; measuring the energy required for maintaining constant oscillation velocity; the mass flow of the medium being assumed proportional to the measured energy; measuring fundamental frequency of the pendulum; the average density of the medium being assumed proportional to the measured fundamental frequency of the pendulum; measuring pressure of the medium within the pendulum housing; and determining by mathematical relationships the mass flow rate of each individual component of the medium.

7. The method according to claim 6, comprising the additional step of measuring, for a two-phase three-component medium, the actual volumetric gas content $\varphi$ in the pendulum.

8. The method according to claim 7, wherein the gas content $\alpha_1$ is determined from the relationship:

$$\alpha_1 = \varphi/(C_4 - \varphi)$$

the density of the liquid phase $\rho_1$ being determined from the relationship $$\rho_1 = \rho_5 + (\rho_6 - \rho_5) \cdot \sigma_1$$

wherein $\rho_5$ is density of a first component of the liquid phase; $\rho_6$ is density of a second component of the liquid phase, and $\rho_6 > \rho_5$; $\sigma_1$ is content of the first component of the liquid phase in the liquid phase proper which is determined from the relationship:

$$\sigma_1 = \frac{\rho_5(1 - \varphi) + \rho_2 \cdot \varphi - \rho}{(\rho_6 - \rho_5)(1 - \phi)}$$

the content of each component of the liquid phase is determined from the following formulae:

$$G_5 = \rho_5/\rho_1 \cdot G_1(1 - \sigma_1)$$

$$G_6 = \rho_6/\rho_1 \cdot G_1 \cdot \sigma_1$$

wherein $G_5$ is mass flow rate of the first component of the liquid phase, and $G_6$ is the mass flow rate of the second component of the liquid phase.

9. The method according to claim 6, wherein the mass flow rate of each individual component of the medium is measured by the following formulae:

$$G_1 = \frac{C_1 \cdot W}{1 + \frac{\rho_2}{\rho_1} \cdot a_1}$$

$$G_2 = \frac{\rho_2}{\rho_1} \cdot G_1 \cdot a_1$$

wherein $G_1$ is mass flow rate of the liquid phase, $G_2$ is mass flow rate of the gaseous phase, $a_1$ is gas content which is determined by the relationships:

$$a_1 = \rho \frac{1 - \frac{\rho}{\rho_1}}{C(1 - P \cdot \frac{\rho_2}{\rho_1}) - (1 - \frac{\rho}{\rho_1})}$$

wherein $(\rho/\rho_1)$ is ratio of average density of the medium to density of the liquid phase $\rho_1$; $\rho_2$ is density of the gaseous phase at normal pressure, $P$ is dimensionless quantity which is numerically equal to the absolute pressure; $C$ is proportionality factor between actual volumetric gas content $\phi$ and flow rate gas content $\beta$; $W$ is energy required to compensate for losses occurring during the pendulum oscillations; and $C_1$ is a proportionality factor.

10. The method according to claim 9, wherein, in case of oil-water-gas medium, the gas factor $\alpha$ is a constant value for each given oil field and is equal to the ratio of volumetric flow rate of gas $Q_2$ to volumetric flow rate of oil $Q_3$; the gas content $a_1$ depends only on water content $\sigma$ which is determined by the relationship:

$$\sigma = \frac{2b \pm \sqrt{4b^2 - 4ac}}{2a}$$

wherein $a = (1 - C)(\rho_4 - \rho_3), 2b = \rho + b_1 \cdot P - b_2,$ $C_2 = [1 - (P/\alpha)] \rho + C_3 \cdot \rho + C_4,$ $b_1 = [(\rho_4 - \rho_3)/\alpha] - C \cdot \rho_2, b_2 = (1 - C)(2\rho_3 - \rho_4),$ $C_1 = (\rho_3/\alpha) + C \cdot \rho_2, C_2 = (1 - C) \cdot \rho_3,$ $C_2, C_3, C_4$ are proportionality factors, $\rho_3$ is oil density, $\rho_4$ is water density, $\rho_1 = \rho_3 + (\rho_4 - \rho_3) \sigma$ $a_1 = a(1 - \sigma)$ is gas content, flow rate of each component of the liquid phase is determined by the following formulae $$G_3 = (\rho_3/\rho_1) G_1(1 - \sigma)$$

$$G_4 = (\rho_4/\rho_1) G_1 \cdot \sigma$$

wherein $G_3$ is mass flow rate of oil, and $G_4$ is the mass flow rate of water.

* * * * *